United States Patent
Li et al.

(10) Patent No.: US 11,625,102 B2
(45) Date of Patent: Apr. 11, 2023

(54) GESTURE CONTROL MODULE, HOUSEHOLD APPLIANCE AND USE OF GESTURE CONTROL MODULE IN HOUSEHOLD APPLIANCE

(71) Applicant: DIEHL AKO STIFTUNG & CO. KG, Wangen (DE)

(72) Inventors: Zhongke Li, Nanjing (CN); Lin Shi, Nanjing (CN)

(73) Assignee: Diehl AKO Stiftung & Co. KG, Wangen (DE)

( * ) Notice: Subject to any disclaimer, the term of this patent is extended or adjusted under 35 U.S.C. 154(b) by 47 days.

(21) Appl. No.: 17/207,978

(22) Filed: Mar. 22, 2021

(65) Prior Publication Data

US 2021/0294426 A1 Sep. 23, 2021

(30) Foreign Application Priority Data

Mar. 20, 2020 (CN) .......................... 202010203660.5

(51) Int. Cl.
*G06F 3/01* (2006.01)
*H04L 12/28* (2006.01)
(Continued)

(52) U.S. Cl.
CPC ............ *G06F 3/017* (2013.01); *G01S 7/4808* (2013.01); *G01S 7/51* (2013.01); *G01S 17/42* (2013.01);
(Continued)

(58) Field of Classification Search
CPC .......... G06F 3/017; G01S 7/4808; G01S 7/51; G01S 17/42; G01S 17/88; H04L 12/282;
(Continued)

(56) References Cited

U.S. PATENT DOCUMENTS 5,406,073 A * 4/1995 Sharp ....................... G01V 8/10
250/221
8,643,628 B1 2/2014 Eriksson et al.
(Continued)

FOREIGN PATENT DOCUMENTS

CN 109539354 A 3/2019
CN 109708168 A * 5/2019 .............. F24C 15/20
(Continued)

*Primary Examiner* — Seung C Sohn
(74) *Attorney, Agent, or Firm* — Laurence A. Greenberg; Werner H. Stemer; Ralph E. Locher

(57) ABSTRACT

A non-contact gesture control module based on the principle of infrared reflection, contains a sensing area composed of a plurality of infrared transmitting tubes and a plurality of infrared receiving tubes, the infrared transmitting tubes and the infrared receiving tubes being alternately arranged in an extending direction. A control circuit controls the switching on and off of the individual infrared transmitting tubes and the individual infrared receiving tubes. A signal processor is provided for receiving and processing signals generated by the plurality of infrared receiving tubes and determining a coordinate position of an object in the extending direction above the sensing area. The gesture control module performs precise non-contact control and fine adjustment of gears and thus stepless speed regulation of a household appliance.

17 Claims, 2 Drawing Sheets

(51) Int. Cl.
*H04N 5/33* (2006.01)
*G01S 7/48* (2006.01)
*G01S 7/51* (2006.01)
*G01S 17/88* (2006.01)
*G01S 17/42* (2006.01)

(52) U.S. Cl.
CPC ............ *G01S 17/88* (2013.01); *H04L 12/282* (2013.01); *H04N 5/33* (2013.01)

(58) Field of Classification Search
CPC ....... H04N 5/33; F24C 7/082; F24C 15/2021; G08C 23/04
See application file for complete search history.

(56) References Cited

U.S. PATENT DOCUMENTS

| | | | |
|---|---|---|---|
| 9,741,184 B2* | 8/2017 | Iyer | G06F 3/0421 |
| 10,948,994 B2* | 3/2021 | Zhang | G06F 1/163 |
| 2016/0116891 A1* | 4/2016 | Megger | G06F 3/0304 |
| | | | 700/275 |
| 2018/0217670 A1 | 8/2018 | Cho et al. | |
| 2021/0199309 A1* | 7/2021 | Zhan | G05B 15/02 |

FOREIGN PATENT DOCUMENTS

| | | |
|---|---|---|
| EP | 0892221 A1 | 1/1999 |
| EP | 3454189 A1 | 3/2019 |

* cited by examiner

GESTURE CONTROL MODULE, HOUSEHOLD APPLIANCE AND USE OF GESTURE CONTROL MODULE IN HOUSEHOLD APPLIANCE

CROSS-REFERENCE TO RELATED APPLICATION

This application claims the priority, under 35 U.S.C. § 119, of Chinese patent application CN 20 2010 203 660.5, filed Mar. 20, 2020; the prior application is herewith incorporated by reference in its entirety.

BACKGROUND OF THE INVENTION

Field of the Invention

The present invention relates to a gesture control module, a household appliance containing the gesture control module and use of the gesture control module in a household appliance.

It is particularly advantageous to use gesture control in kitchen appliances or sanitary appliances, as it is possible to keep the appliances clean and sanitary by a non-contact operation. At the same time, based on a non-contact operation, it is also possible to implement that the user's hands are not contaminated. The non-contact gesture control module in the prior art is normally composed of an infrared receiving tube and an infrared transmitting tube or composed of an infrared receiving tube and a plurality of infrared transmitting tubes. Such gesture control module can only detect the approach, the stay, or a roughly passing direction of an object in the area of the infrared receiving tube, so that single gestures can be realized, and thus only limited control functions can be realized as well. Moreover, such gesture control module cannot perform precise non-contact control of household appliances. With increasingly abundant functions of household appliances, there is an urgent need to expand the operation functions of the gesture control module.

BRIEF SUMMARY OF THE INVENTION

It is an object of the present invention to provide an improve gesture control module, a household appliance containing the gesture control module and use of the gesture control module in a household appliance.

According to a first aspect of the present invention, a non-contact gesture control module based on the principle of infrared reflection is provided. The gesture control module contains:
a) a sensing area composed of a plurality of infrared transmitting tubes and a plurality of infrared receiving tubes, the infrared transmitting tubes and the infrared receiving tubes being alternately arranged in an extending direction;
b) a control circuit for controlling the switching on and off of the individual infrared transmitting tubes and the individual infrared receiving tubes;
c) a signal processor for receiving and processing signals generated by the plurality of infrared receiving tubes and determining a coordinate position of an object in the extending direction above the sensing area.

The gesture control module according to the present invention can realize a non-contact gesture operation. In the present invention, the plurality of infrared transmitting tubes may be at least three infrared light emitting diodes. The plurality of infrared transmitting tubes can emit infrared light, wherein the infrared light may have a wavelength of between 770 nm and 1 mm. The infrared light can be reflected and received by the infrared receiving tubes when an object such as a user's hand approaches. The plurality of infrared receiving tubes may be constituted as at least three infrared photosensitive diodes or infrared photosensitive triodes. The infrared transmitting tubes and the infrared receiving tubes are alternately arranged in an extending direction. Here, the extending direction is an arrangement direction of the infrared transmitting tubes and the infrared receiving tubes. By way of the alternate arrangement manner, compared with the gesture operation module in the prior art, an expanded sensing area or operable position is provided so that diversified gestures may be detected. With such alternate arrangement manner, the infrared transmitting tubes and the infrared receiving tubes that are adjacent to one another can be multiplexed with one another. For example, an infrared receiving tube may receive infrared light transmitted by the infrared transmitting tube on its one side and reflected by an object, and may also receive infrared light transmitted by the infrared transmitting tube on its other side and reflected by the object. The infrared light transmitted by an infrared transmitting tube is reflected by the object and can be received either by the infrared receiving tube on its one side or the infrared receiving tube on its other side. In this way, it is possible to reduce the manufacturing cost of hardware.

The control circuit is configured to control the switching on and off of the individual infrared transmitting tubes and the individual infrared receiving tubes. In particular, the control circuit controls the state of the individual infrared transmitting tubes and infrared receiving tubes according to a predetermined time sequence. The gesture control module in the prior art generally only includes one infrared receiving tube, wherein its infrared transmitting tube may remain on all the time. In the gesture control module according to the present invention, the infrared light transmitted by the individual infrared transmitting tubes might be received by a plurality of infrared receiving tubes simultaneously, so that it is necessary to manage the on and off of the individual infrared transmitting tubes and the individual infrared receiving tubes.

The signal processor is configured to receive and process signals generated by the plurality of infrared receiving tubes and determine a coordinate position of an object in the extending direction above the sensing area. When the object moves above the sensing area, the signal processor determines that the object is above one or more infrared receiving tubes according to the received signals of the individual infrared receiving tubes, for example, by comparing the signals, so as to determine a coordinate position of the object in the extending direction.

Compared with the existing gesture detection module, based on an expanded sensing area, the operable positions are also correspondingly increased. According to the present invention, it is possible to implement positioning the object approaching the sensing area, so that diversified gestures and operation functions are correspondingly realized based on its exact position.

In the present invention, for example, a plurality of different operation functions may be configured at the coordinates within the sensing area. For example, the sensing area is divided into a plurality of coordinate intervals, each of which may represent a function of the household appliance. In this way, the configured function may be realized according to a coordinate position of the object. By using the gesture sensing module of the present invention, it is possible to position different positions of the approaching object, and further realize precise non-contact control. In addition, by way of the gesture control module of the present invention, it is also possible to adjust the gears of the household appliance. For example, the sensing area is divided into different gears according to the coordinates, and the household appliance is triggered to apply different gears according to the coordinates of the object, so that the household appliance can be adjusted in a plurality of gears. In particular, stepless adjustment is realized directly according to the determined coordinate position. Brushless motors and frequency converters are increasingly applied in the field of household appliances, and thus there is also a potential for stepless adjustment. The coordinate position of the gesture control module of the present invention is finely positioned so that it is particularly advantageous to meet the requirement of stepless adjustment.

It should be noted that the gesture control module of the present invention is not a simple combination of modules composed of an infrared receiving tube and an infrared transmitting tube or modules composed of an infrared receiving tube and a plurality of infrared transmitting tubes in the prior art. Instead, the alternately row-like arrangement manner of infrared transmitting tubes and infrared receiving tubes is combined with control of these infrared tubes and the processing of the generated signals so as to comprehensively and organically implement gesture recognition of the gesture control module, and particularly positioning of the object approaching the sensing area. Moreover, such positioning cannot be achieved by a combination of modules in the prior art as well. On the one hand, the signals of the individual infrared receiving tubes may be disturbed by the infrared light from other modules, so that the signals of the individual modules interfere and couple with each other, which makes it difficult to perform gesture recognition. On the other hand, it is also difficult to closely arrange a plurality of modules together due to the design size, the space structure, the detection requirements or the circuit wiring, etc. In the present invention, a plurality of infrared transmitting tubes and a plurality of infrared receiving tubes share a control circuit and a signal processor, which can also implement saving the cost of hardware as compared with the prior art.

According to one embodiment of the present invention, the signal processor determines a normal distance of the object relative to the sensing area according to the signals generated by the infrared receiving tubes. The normal distance refers to a distance between the object and the sensing area in a direction perpendicular to the extending direction of the infrared transmitting tube and the infrared receiving tube, that is, a distance in the height direction. When the normal distance can be determined, the gesture control module can recognize a movement of the object in the normal direction, so that the gesture control module can recognize a gesture in the normal direction.

According to one embodiment of the present invention, the beginning and/or the end of the sensing area is an infrared transmitting tube. In this way, it is ensured that each infrared receiver tube can effectively receive infrared signals.

According to one embodiment of the present invention, the extending direction is a straight line direction, a fold line direction, a plane tangent direction, or a space tangent direction. Here, the infrared transmitting tubes and the infrared receiving tubes may be distributed along a straight line, a fold line, a triangle, a square, a rectangle, a parallelogram, a curve, a circle, an ellipse, or an irregular shape within a plane, or may be distributed along a curved surface, such as a cylindrical surface, a spherical surface, an ellipsoid surface, a conical surface, a hyperboloidal surface, a parabolic surface or an irregular curved surface within a space. In this way, it is possible to allow the shape of the gesture control module to follow a geometric design of the surface to be operated. In particular, the plurality of infrared transmitting tubes and the plurality of infrared receiving tubes are spaced apart from one another at the same distance.

According to one embodiment of the present invention, the control circuit controls the switching on and off of the individual infrared transmitting tubes and the individual infrared receiving tubes in the time division multiplexing manner. By using a time division multiplexing control manner, it is possible to switch on and off the individual infrared transmitting tubes and the individual infrared receiving tubes in staggered time, thereby reducing the disturbance of the infrared receiving tubes by the reflected light of a plurality of infrared transmitting tubes. In this way, it is possible to more favorably realize signal decoupling.

According to one embodiment of the present invention, the control circuit controls the switching on and off of the individual infrared transmitting tubes and the individual infrared receiving tubes in the following manner:
a) switching on all the infrared receiving tubes simultaneously, and switching on each of the infrared transmitting tubes in sequence, or
b) switching on one or more infrared transceiver groups in sequence, each of which includes at least one of infrared transmitting tubes and at least one of infrared receiving tubes adjacent to one another, or
c) switching on a plurality of non-adjacent infrared transceiver groups in staggered time, each of which includes at least one of the infrared transmitting tubes and at least one of the infrared receiving tubes adjacent to one another.

When all the infrared receiving tubes are switched on simultaneously and each of the infrared transmitting tubes is switched on in sequence, the infrared light transmitted by only one infrared transmitting tube at each moment may be received by the infrared receiving tubes after being reflected. In such switched-on manner, it is possible to avoid the disturbance the individual infrared receiving tubes by the reflected light from a plurality of infrared transmitting tubes. It may also be contemplated that when each of the infrared transmitting tubes is switched on in sequence, only one or more infrared receiving tubes adjacent to the infrared transmitting tube, for example, two infrared receiving tubes arranged adjacent to the infrared transmitting tube, are switched on. Here, the infrared light transmitted from one infrared transmitting tube that is switched on is only received by the adjacent infrared receiving tube(s) after being reflected, which reduces the amount of signals to be processed by the signal processing device, thereby improving the data processing efficiency. After all the infrared transmitting tubes are switched on in sequence within the sensing area, it is counted as one scanning period, and then a plurality of scanning periods are cycled. Within one scanning period, each of the infrared receiving tubes may generate the following signal time sequence, such that infrared light is transmitted by one infrared transmitting tube at each moment in the generated signal time sequence. In this way, the signal processor may simply determine an infrared receiving tube corresponding to the approaching object.

In one variant, one or more infrared transceiver groups are switched on in sequence, each of which includes at least one of infrared transmitting tubes and at least one of infrared receiving tubes adjacent to one another. By switching on the individual infrared transmitting tubes and infrared receiving tubes in groups, each of the infrared receiving tubes can only receive the reflection signals from the infrared transmitting tube of the same group at each moment. Therefore, the complexity of signal processing is reduced and the calculation efficiency is improved.

In another variant, a plurality of non-adjacent infrared transceiver groups are switched on in staggered time, each of which includes at least one of the infrared transmitting tubes and at least one of the infrared receiving tubes adjacent to one another. This variant is advantageous when there is a long sensing area, as it takes a long time to switch on each of the infrared transmitting tubes in sequence to complete one signal scan. Therefore, if a plurality of infrared transceiver groups that are not adjacent to one another work simultaneously, it is possible to reduce the scanning time.

According to one embodiment of the present invention, the coordinate position of the object in the extending direction above the sensing area is determined based on the amplitude and/or slope and/or phase of the signals generated by the individual infrared receiving tubes and/or normal distance of the object relative to the sensing area. The signal processor receives and processes the signal time sequences generated by the plurality of infrared receiving tubes. For example, by comparing the amplitudes of the signals, it is possible to determine a peak position of the reflected light, thereby determining a coordinate position where the object is situated. For example, by calculating the slopes of the signals, it is possible to determine changes in the reflected light, thereby determining whether the object is in an approaching movement or a departing movement. For example, by comprehensively calculating changes in the amplitudes, slopes, and phases of the signals, it is possible to determine a more accurate coordinate position where the object is situated. Here, by determining the coordinate position of the object in the extending direction above the sensing area and the normal distance of the object relative to the sensing area, and particularly the change in the coordinate position and the normal distance, it is possible to determine a dynamic change of the object above the sensing area, thereby implementing recognizing a plurality of gestures.

For instance, the position of the object is determined based on the amplitude. Within each scanning period, the gesture control module may obtain a signal with a maximum amplitude by comparing the time sequences of the received signals. As a result, it may be considered that the object is located in the vicinity of the infrared transmitting tube that generates a signal with a maximum amplitude. By cycling a plurality of scanning periods, the position where the object is situated may be continuously updated. Within a plurality of scanning periods, if it is recognized that the signal with a maximum amplitude appears on different signal receiving tubes, it may be determined that the object is moving in translation along the extending direction above the sensing area. However, if it is recognized that the signal having a relatively maximum but constantly changing amplitude only appears on the same one or more signal receiving tubes, it may be determined that the object only moves in the normal direction. On this basis, if the amplitude of the signal gradually increases in the signal time sequence, it may be recognized that the normal distance of the object relative to the sensing area gradually decreases. If the amplitude of the signal gradually decreases, it may be recognized that the normal distance of the object relative to the sensing area gradually increases.

According to one embodiment of the present invention, the sensing area is divided into a plurality of operation sub-regions, the gesture for the operation sub-region is recognized if an object is detected in one or more of the operation sub-regions. In this way, the sensing area is divided into a plurality of operation sub-regions, and if the object is detected only in the one or more operation sub-regions within a plurality of scanning periods, it may be considered that the object performs operation on the corresponding operation sub-region(s), thereby only recognizing gestures within the operation sub-region(s) without considering other operation sub-regions. Thus, on the one hand, the amount of data processing may be reduced, and on the other hand, the mutual interference between different functions provided within the sensing area can be implemented.

According to one embodiment of the present invention, one or more visible light-emitting devices are arranged in the surrounding of the detecting area. The visible light-emitting device is implemented preferably by one or more visible light emitting diodes within a visible light range and preferably by corresponding optical devices such as a light guide body, a light guide cavity and a visible light scattering layer, etc.

According to one embodiment of the present invention, the visible light-emitting device indicates the current position of the object, the input gesture or operation tips. In this way, the user is provided with required indications and feedbacks. When the one or more visible light-emitting devices are divided into sub-regions corresponding to the operation sub-regions on the sensing area, if it is detected that the object is located above the one or more operation sub-regions, the light-emitting color or light-emitting brightness of the visible light-emitting device in the operation sub-region(s) is changed so that it is possible to feedback to the user that the operation is received and correspondingly indicate a current position of the object. In addition, if the gesture control module recognizes a gesture, the visible light-emitting device may indicate the input gesture by means of an icon corresponding to the gesture. In addition, the visible light-emitting device may also prompt the user of the currently operable functions during operation. For example, the user is prompted to perform left wave or right wave in the form of a flowing water lamp. It is also possible to perform light feedback of the gesture that has been recognized in a flashing manner, for example flashing twice to indicate to the user that a gesture is detected.

According to one embodiment of the present invention, the gesture control module is capable of recognizing at least one of or a combination of the following gestures:
a) sliding positioning,
b) waving,
c) hovering;
d) clicking, and/or
e) tapping.

The gesture control module recognizes a corresponding gesture according to the changes in the positions of the object within a plurality of scanning periods. Wherein, the sliding positioning gesture represents that an object, for example, a hand moves left or right (or up or down) starting from any position in the sensing area of the gesture control module. With the gesture control module, it is possible to determine the coordinate position of the object in the extending direction and/or the normal distance of the object relative to the sensing area. The waving gesture includes a left wave or a right wave, which represents that an object moves from one end of the sensing area to the other end of the sensing area. In particular, if the gesture control module detects that the object moves from a beginning of the sensing area to an end in the extending direction or from an end to a beginning, a waving gesture is recognized. The hovering gesture represents that the object holds afar within a certain distance range above the sensing area for a certain time. Therefore, if the gesture control module has not detected the change in the coordinate position of the object in the extending direction and the change in the normal distance of the object relative to the sensing area within a period of time, a hovering gesture is recognized. The clicking gesture represents that the object already within a certain distance range further approaches the sensing area. Therefore, if the gesture control module recognizes that the normal distance of the object relative to the sensing area at any position of the sensing area is further reduced, the clicking gesture is recognized. The tapping gesture represents that the object gradually approaches the gesture control module along a normal direction from afar in a certain distance range at a certain speed and holds for a certain time within a certain distance range from the surface of the gesture control module, and then gradually moves away from the gesture control module along a normal direction at a certain speed. Therefore, if the gesture control module recognizes that the object at any position of the sensing area has a gradually decreasing normal distance relative to the sensing area and maintains the certain normal distance for a period of time, and then recognizes that the object at any position in the sensing area has a gradually increasing normal distance relative to the sensing area, then a tapping gesture is recognized.

The above-described gesture detection may improve the reliability by comprehensively determining a plurality of parameters. For example, by adding the determination of a further approach by "further approaching from afar in a certain distance range at a certain speed" in the clicking gesture, it is possible effectively enhance the reliability, and particularly eliminate the disturbance of oil smoke. Moreover, in combination of the determinations by "gradually approaching from afar in a certain distance range at a certain speed" and "holding for a certain time within a certain distance range from the surface of the gesture control module", it is possible to effectively filter out the disturbance caused by a person's head. For another example, in the tapping gesture, by determining these contents by "gradually approaching from afar in a certain distance range at a certain speed", "holding for a certain time within a certain distance range from the surface of the gesture control module", and "gradually moving away from the gesture control module at a certain speed", it is possible to very reliably filter out the disturbance caused by the oil smoke, the ambient light variation, as well as the approach or movement of a person's head.

According to a second aspect of the present invention, a household appliance 6 is provided. The household appliance 6 contains one or more gesture control modules described above. The household appliance 6 is a range hood 6, a refrigerator 6, an oven 6, a food blender 6, a washing machine 6, a smart faucet 6 or a smart toilet 6. The operation of the above-described household appliances may be realized by the non-contact gesture control module of the present invention without contact by hand. Moreover, it is possible to realize diversified gestures and operation functions (particularly fine adjustment and thus stepless adjustment) of the household appliance.

According to a third aspect of the present invention, use of the gesture control module described above in a household appliance is provided. The gesture control module is used for control of at least one of the following functions of the household appliance:

a) turning on or off the household appliance,
b) turning up/down gears,
c) shifting operation modes,
d) fine adjustment of gears,
e) specific mode, and
f) switching on or off lights.

The above-described functions are commonly used functions of the household appliance. Wherein, the specific mode is a stepless speed regulation mode. It is also possible to use the gesture control module to control other functions of the household appliance.

According to one embodiment of the present invention, the use includes:

a) using clicking or hovering to turn on or off the household appliance,
b) using the waving gesture to turn up/down the gears and/or to shift operation modes,
c) using the hovering or clicking gesture for confirmation,
d) using the tapping gesture to realize the switch function.

Wherein, with the sliding positioning gesture, it is possible to detect the coordinate position of the hand in the extending direction above the sensing area and/or the normal distance of the hand relative to the sensing area, thereby triggering a corresponding function on the sensing area according to the coordinates of the hand. With the hovering or clicking gesture to implement confirmation, the confirmation may be a confirmation of a triggered mode or a confirmation of fine adjustment of gears. With the tapping gesture, the switch function is realized, wherein the switch function may be the function of turning on or off the light, opening or closing the door, and switching on or off the valve.

According to one embodiment of the present invention, when the household appliance is configured as a range hood, the use includes:

a) using the sliding positioning gesture to trigger the corresponding function,
b) using clicking or hovering to choose the triggered function,
c) using clicking or hovering to choose the triggered function, and
d) using the sliding positioning gesture to realize a fine adjustment for gears of the range hood.

For example, in a standby state of the range hood, the sensing area is divided into the following functions that are commonly used: switching on/off; turn on/off lights; first-gear air speed (minimum air speed); second-gear air speed (medium air speed); third-gear air speed (maximum air speed); specific mode (i.e., stepless speed regulation). If the user desires to enter a specific mode, the user first uses a sliding positioning gesture to move the hand to a sensing area corresponding to the desired function, that is, a specific mode. Subsequently, with the clicking or hovering gesture, the specific mode is confirmed. Thereafter, with the waving gesture, the range hood is switched to the specific mode. In the specific mode, the sensing area is finely divided into a plurality of sub-regions according to the coordinates of the object in the extending direction, such that the user may use a sliding positioning gesture to realize a fine adjustment for gears of the range hood.

In the present invention, the functions, effects or advantages described for one aspect are applicable to other aspects of the present invention in a corresponding manner, and vice versa.

Other features which are considered as characteristic for the invention are set forth in the appended claims.

Although the invention is illustrated and described herein as embodied in a gesture control module, a household appliance and a use of gesture control module in household appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
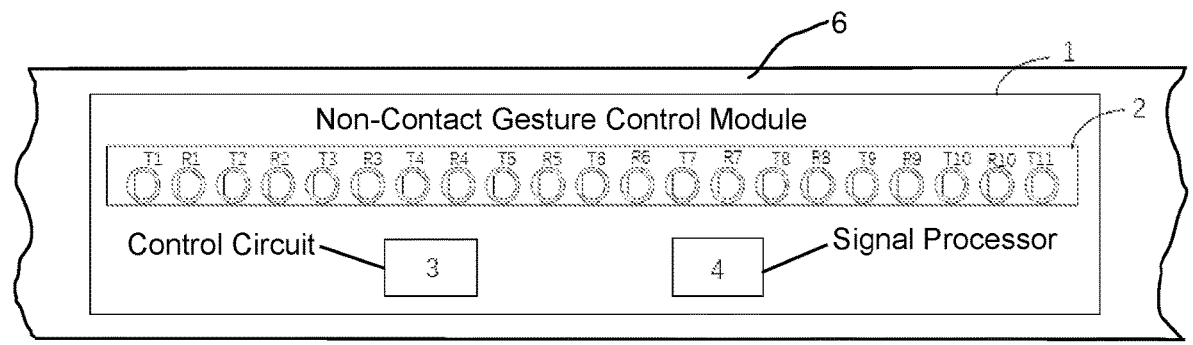
FIG. 1 is a schematic diagram of a non-contact gesture control module based on the principle of infrared reflection according to the present invention.

Referring now to the figures of the drawings in detail and first, particularly to FIG. 1 thereof, there is shown a schematic diagram of a non-contact gesture control module 1 based on the principle of infrared reflection according to the present invention. The gesture control module 1 includes a sensing area 2 composed of eleven infrared transmitting tubes T1 to T11 and ten infrared receiving tubes R1 to R10. Here, the beginning and the end of the sensing area 2 is an infrared transmitting tube. However, other numbers of infrared transmitting tubes and infrared receiving tubes may also be provided. The infrared transmitting tubes and the infrared receiving tubes are alternately arranged along a straight line. However, it may also be contemplated that the extending direction may be a fold line direction, a plane tangent direction, or a space tangent direction. In addition, the gesture control 1 also includes a control circuit 3 and a signal processor 4. The control circuit 3 is configured to control the switching on and off of the individual infrared transmitting tubes and the individual infrared receiving tubes. The signal processor 4 is configured to receive and process signals generated by the plurality of infrared receiving tubes and determine a coordinate position of an object in the extending direction above the sensing area.

Figure 2:
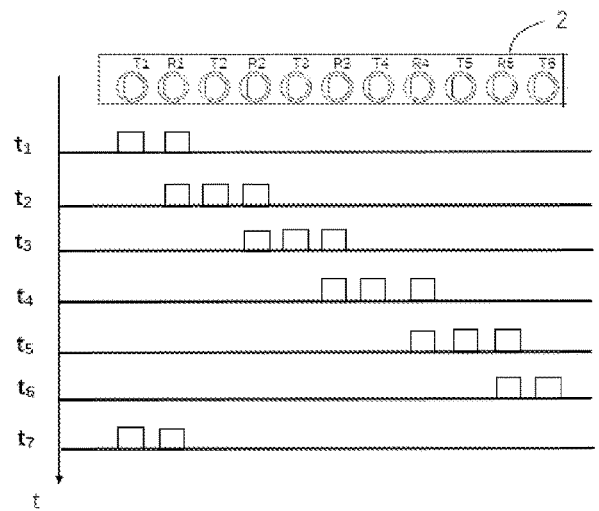
FIG. 2 is an illustration of a time sequence diagram of a control circuit controlling a switching on and off of individual infrared transmitting tubes and the individual infrared receiving tubes according to the first embodiment.

FIG. 2 shows a time sequence diagram of the control circuit 3 controlling the switching on and off of the individual infrared transmitting tubes and the individual infrared receiving tubes according to the first embodiment. The control circuit 3 controls the switching on and off of the individual infrared transmitting tubes and the individual infrared receiving tubes in the time division multiplexing manner. In order to clearly elaborate the control method, only six infrared transmitting tubes T1 to T6 and five infrared receiving tubes R1 to R5 are shown in FIG. 2. In the figure, the ordinate represents time, and the abscissa represents states of the individual infrared transmitting tubes and infrared receiving tubes, wherein the high level represents the on state and the low level represents the off state. In FIG. 2, when each of the infrared transmitting tubes is switched on in sequence, only the infrared receiving tube(s) arranged adjacent to the infrared transmitting tube is switched on. Here, the infrared light transmitted from one infrared transmitting tube that is switched on is only received by the adjacent infrared receiving tube(s) after being reflected, which reduces the number of signals generated by the infrared receiving tubes that are required to be processed, thereby facilitating the data processing. In the current embodiment, at a moment t1, the infrared transmitting tube T1 and the infrared receiving tube R1 are switched on, and the reflected light of the infrared transmitting tube T1 is received by the infrared receiving tube R1. As a result, at the moment t1, a signal S1 is generated on the infrared receiving tube R1. Next, at a moment t2, the infrared transmitting tube T2 and the adjacent infrared receiving tubes R1 and R2 are switched on, and the reflected light of the infrared transmitting tube T2 is received by the infrared receiving tubes R1 and R2. Thus, at the moment t2, a signal S2 is generated on R1, and a signal S3 is generated on R2. Subsequently, the individual infrared transmitting tubes are switched on in sequence. After one scan is completed, the amplitudes and/or slopes and/or phases of the signals S1 to S10 generated on the individual receiving tubes are compared so that it is possible to at least determine that the object is in the vicinity of one or more infrared receiving tubes thereof. In this way, the coordinates of the object can be obtained. The scanning process is continuously cycled, so that a trajectory of the object can be determined, and thus a gesture can be determined.

Figure 3:
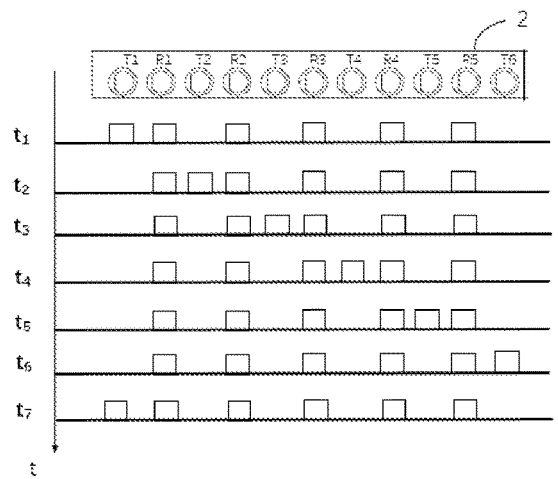
FIG. 3 is an illustration showing a time sequence diagram of the control circuit controlling the switching on and off of the individual infrared transmitting tubes and the individual infrared receiving tubes according to the second embodiment.

FIG. 3 shows a time sequence diagram of the control circuit 3 controlling the switching on and off of the individual infrared transmitting tubes and the individual infrared receiving tubes according to the second embodiment. Wherein the difference from the first embodiment is that all the infrared receiving tubes R1 to R5 are switched on simultaneously, and the individual infrared receiving tubes remain on at all time, and each of the infrared transmitting tubes T1 to T6 is switched on in sequence. Therefore, only one infrared transmitting tube transmits infrared light at each moment, and its reflected light may be received by all the infrared receiving tubes. In the second embodiment, within one scanning period, each of the infrared receiving tubes may receive the reflected signal from the individual infrared transmitting tubes at different times. As a result, it is possible to more precisely determine the coordinates of the object.

Figure 4:
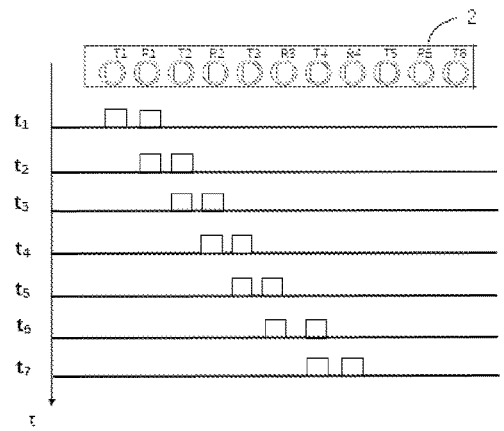
FIG. 4 is an illustration showing a time sequence diagram of the control circuit controlling the switching on and off of the individual infrared transmitting tubes and the individual infrared receiving tubes according to the third embodiment.

FIG. 4 shows a time sequence diagram of the control circuit 3 controlling the switching on and off of the individual infrared transmitting tubes and the individual infrared receiving tubes according to the third embodiment. In a third embodiment, one or more infrared transceiver groups are switched on in sequence, each of which includes at least one of infrared transmitting tubes and at least one of infrared receiving tubes adjacent to one another. In a current embodiment, each of the infrared transceiver groups includes one infrared transmitting tube and one infrared receiving tube adjacent to one another. Compared with the first embodiment, each of the infrared receiving tubes can only transmit the reflection signals from the infrared transmitting tube of the same group at each moment. Therefore, it is possible to reduce the complexity of signal processing and improve the calculation efficiency.

Figure 5:
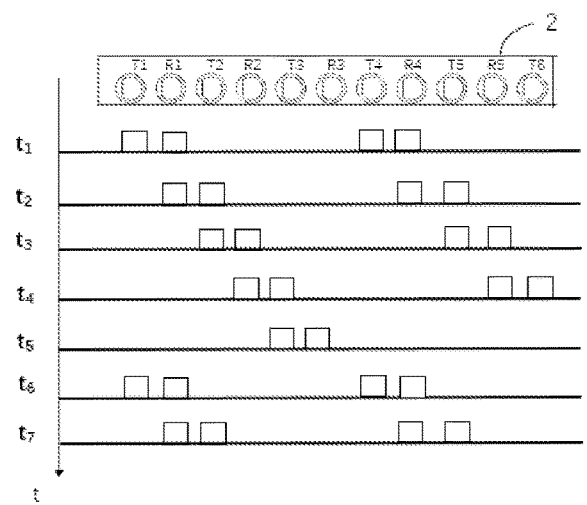
FIG. 5 is an illustration showing a time sequence diagram of the control circuit controlling the switching on and off of the individual infrared transmitting tubes and the individual infrared receiving tubes according to the fourth embodiment.

FIG. 5 shows a time sequence diagram of the control circuit 3 controlling the switching on and off of the individual infrared transmitting tubes and the individual infrared receiving tubes according to the fourth embodiment. In a fourth embodiment, a plurality of non-adjacent infrared transceiver groups are switched on in staggered time, each of which includes at least one of the infrared transmitting tubes and at least one of the infrared receiving tubes adjacent to one another. In the case of a long sensing area, it takes a long time if each of the infrared transmitting tubes is switched on in sequence to complete one signal scan. Therefore, if a plurality of infrared transceiver groups that are not adjacent to one another work simultaneously, it is possible to reduce the scanning time.

Figure 6:
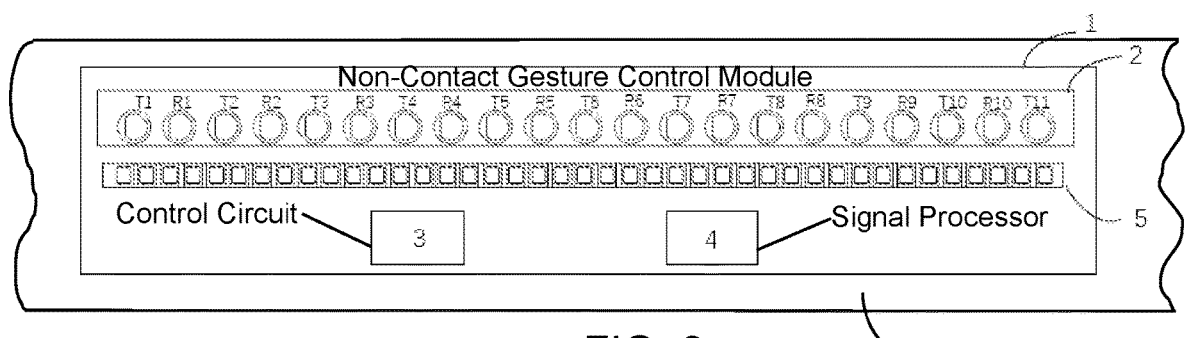
FIG. 6 is a schematic diagram of another non-contact gesture control module based on the principle of infrared reflection according to the present invention.

FIG. 6 shows a schematic diagram of another non-contact gesture control module based on the principle of infrared reflection according to the present invention. Compared with the embodiment shown in FIG. 1, the gesture control module shown in FIG. 6 is provided with a plurality of visible light-emitting devices 5 around the detecting area 2. In the current embodiment, the visible light-emitting device is a plurality of visible light emitting diodes. However, other optical devices such as a light guide body, a light guide cavity and a visible light scattering layer are also possible. The visible light-emitting device may indicate the current position of the object, the input gesture or operation tips.

The present invention is not limited to the embodiments shown, but includes or encompasses all technical equivalents that fall within the effective scope of the appended claims. The positional descriptions selected in the description, for example, up, down, left, right, and the like, refer to direct descriptions and illustrated drawings and can be transferred to new positions for use according to the meanings when the positions change.

The invention claimed is:

1. A non-contact gesture control module based on a principle of infrared reflection, comprising:
a sensing area having a plurality of infrared transmitting tubes and a plurality of infrared receiving tubes, said infrared transmitting tubes and said infrared receiving tubes being alternately disposed in an extending direction;
a control circuit for controlling a switching on and off of individual ones of said infrared transmitting tubes and individual ones of said infrared receiving tubes; and
a signal processor for receiving and processing signals generated by said plurality of infrared receiving tubes and determining a coordinate position of an object in the extending direction above said sensing area.

2. The gesture control module according to claim 1, wherein said signal processor determines a normal distance of the object relative to said sensing area according to the signals generated by said infrared receiving tubes.

3. The gesture control module according to claim 1, wherein a beginning and/or an end of said sensing area is defined by one of said infrared transmitting tubes.

4. The gesture control module according to claim 1, wherein the extending direction is a straight line direction, a fold line direction, a plane tangent direction, or a space tangent direction.

5. The gesture control module according to claim 1, wherein said control circuit controls the switching on and off of individual ones of said infrared transmitting tubes and individual ones of said infrared receiving tubes in a time division multiplexing manner.

6. The gesture control module according to claim 5, wherein said control circuit controls the switching on and off of individual ones of said infrared transmitting tubes and individual ones of said infrared receiving tubes in a following manner:
switching on all of said infrared receiving tubes simultaneously, and switching on each of said infrared transmitting tubes in sequence; or
switching on at least one infrared transceiver group in sequence, each said at least one infrared transceiver group includes at least one of said infrared transmitting tubes and at least one of said infrared receiving tubes adjacent to one another; or
switching on a plurality of non-adjacent infrared transceiver groups in staggered time, each of which includes at least one of said infrared transmitting tubes and at least one of said infrared receiving tubes adjacent to one another.

7. The gesture control module according to claim 1, wherein said sensing area is divided into a plurality of operation sub-regions, a gesture for an operation sub-region of said operation sub-regions is recognized if the object is detected in at least one of said operation sub-regions.

8. The gesture control module according to claim 1, wherein the coordinate position of the object in the extending direction above said sensing area is determined based on an amplitude and/or slope and/or phase of the signals generated by individual ones of said infrared receiving tubes.

9. The gesture control module according to claim 2, wherein the normal distance of the object relative to said sensing area is determined based on an amplitude and/or slope and/or phase of the signals generated by individual ones of said infrared receiving tubes.

10. The gesture control module according to claim 1, further comprising at least one visible light-emitting device is disposed in a surrounding of a detecting area.

11. The gesture control module according to claim 10, wherein said at least one visible light-emitting device indicates a current position of the object, an input gesture or operation tips.

12. The gesture control module according to claim 1, wherein the gesture control module is capable of recognizing at least one of or a combination of the following gestures:
sliding positioning;
waving;
hovering;
clicking; and
tapping.

13. A household appliance, comprising:
at least one non-contact gesture control module according to claim 1.

14. The household appliance according to claim 13, wherein the household appliance is a range hood, a refrigerator, an oven, a food processor, a washing machine, a smart faucet or a smart toilet.

15. A method of using a gesture control module according to claim 1 in a household appliance, wherein the non-contact gesture control module is used for controlling at least one of the following functions of the household appliance:
   turning on or off the household appliance;
   turning up/down gears;
   shifting operation modes;
   fine adjustment of gears;
   specific mode; and
   switching on or off lights.

16. The method according to claim 15, which further comprises:
   using a clicking or hovering gesture to turn on or off the household appliance;
   using a waving gesture to turn up/down the gears and/or to shift the operation modes;
   using the hovering or clicking gesture for confirmation; and
   using a tapping gesture to realize a switch function.

17. The method according to claim 16, wherein the household appliance is configured as a range hood and which further comprises:
   using a sliding positioning gesture to trigger a corresponding function;
   using the clicking or hovering gesture to choose a triggered function;
   using the waving gesture to switch to the specific mode;
   using the sliding positioning gesture to realize a fine adjustment for the gears of the range hood.

* * * * *